United States Patent [19]

Pedretti et al.

[11] Patent Number: 4,888,409

[45] Date of Patent: Dec. 19, 1989

[54] THERMOTROPIC COPOLYAZOMETHINES AND PROCESS FOR PREPARING THEM

[75] Inventors: Ugo Pedretti; Cesarina Bonfanti, both of Milan; Enrico Montani, San Donato Milanese; Hassan A. Hakemi, San Donato Milanese; Arnaldo Roggero, San Donato Milanese, all of Italy

[73] Assignee: Eniricerche S.p.A., Milan, Italy

[21] Appl. No.: 280,746

[22] Filed: Dec. 6, 1988

[30] Foreign Application Priority Data

Dec. 22, 1987 [IT] Italy ................. 23152 A/87

[51] Int. Cl.$^4$ .......................... C08G 14/02
[52] U.S. Cl. .......................... 528/129; 528/149; 528/153; 528/154; 528/245; 528/266
[58] Field of Search ........... 528/129, 149, 153, 154, 528/245, 266

[56] References Cited

U.S. PATENT DOCUMENTS

| | | | |
|---|---|---|---|
| 3,198,767 | 8/1965 | Matsuda et al. | 528/228 |
| 3,418,281 | 12/1968 | Smith et al. | 528/236 |
| 3,418,284 | 12/1968 | Everson et al. | |
| 3,493,522 | 2/1970 | Webb | 528/176 |
| 3,516,970 | 6/1970 | Webb | 528/245 |
| 3,516,971 | 6/1970 | Webb | |
| 3,526,611 | 9/1970 | Webb | |
| 4,048,148 | 9/1977 | Morgan | |
| 4,122,070 | 10/1978 | Morgan | 528/149 |
| 4,330,457 | 5/1982 | East et al. | 524/602 |

FOREIGN PATENT DOCUMENTS 1080526  8/1967  United Kingdom .

OTHER PUBLICATIONS

CA109(24):211546q "Synthesis and Characterization of Thermotropic Poly(Azomethine Ethers) Containing Ethylene Oxide Units".
CA106(18):138821g "Aromatic -Aliphatic Azomethine Ether Polymers and Fibers".
CA106(18):138820f "Aromatic Azomethine Polymers and Fibers".
CA91(14):108369v "Thermotropic Mesophases of Poly (Azomethines) with Flexible Chains".

*Primary Examiner*—John Kight
*Assistant Examiner*—S. A. Acquah
*Attorney, Agent, or Firm*—Hedman, Gibson, Costigan & Hoare

[57] ABSTRACT

Thermotropic copolyazomethines having a mesophase temperature range lying within a desired range of values are obtained by copolymerizing terephthalic aldehyde with at least two different 1,n-bis(4-aminophenoxy)alkanes.

Such copolyazomethines are particularly useful as reinforcing materials for the usual thermoplastic polymers, such as polycarbonate, polybutyleneterephthalate, polyethyleneterephthalate and polyamides.

5 Claims, 1 Drawing Sheet

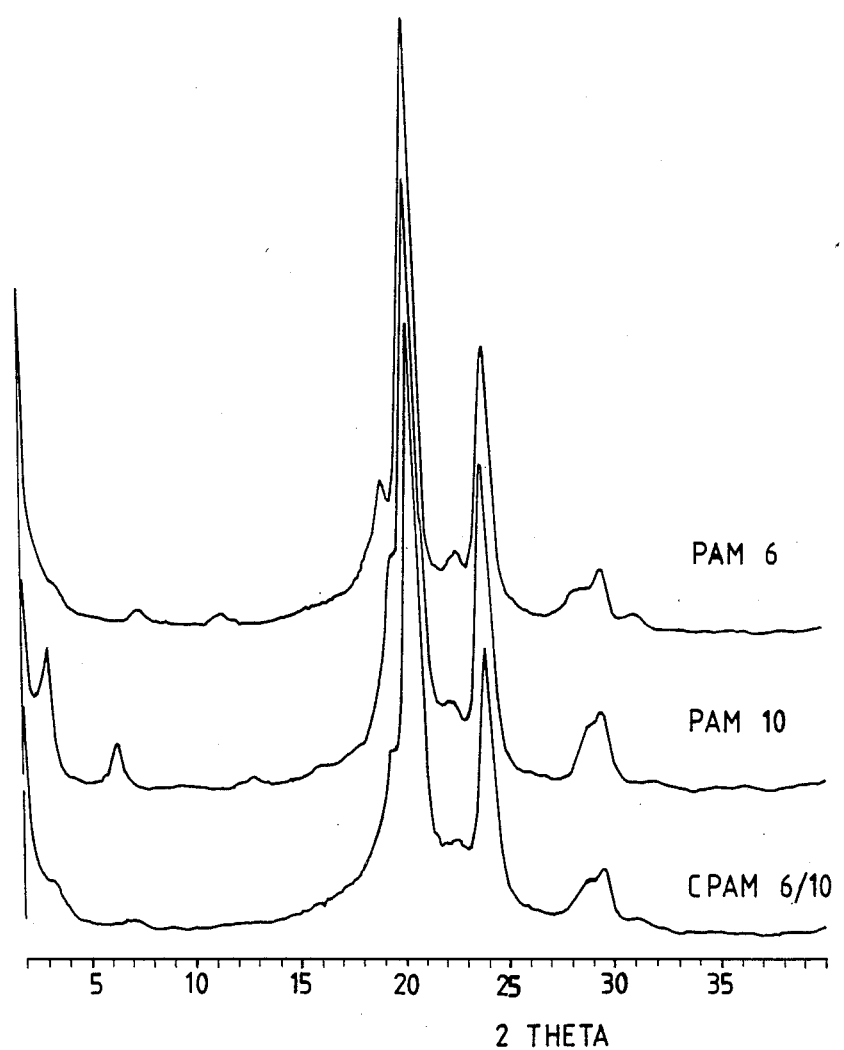

THERMOTROPIC COPOLYAZOMETHINES AND PROCESS FOR PREPARING THEM

This invention relates to thermotropic copolyazomethines and the process for their preparation.

Known in the art are polymers which are capable of maintaining a high degree of order in the polymeric chains when in the liquid state, and, consequently, exhibit the characteristic behaviour of a liquid crystal.

More particularly, two classes of such polymers are known, and more precisely the lyotropic polymers, which originate orderly systems in solution, and the thermotropic polymers, which originate orderly systems in the molten state.

Among the polymers which are capable of originating liquid-crystal structures in the molten state (mesophases) known are the polyazomethines having a thoroughly aromatic structure: they are disclosed, for example, in the patent specifications U.S. Pat. No. 4,048,148 and U.S. Pat. No. 4,122,070. An alternative are the polyazomethines in which stiff units (of an aromatic origin) are connected to each other by flexible segments (of an aliphatic nature), such as those which contain in their molecule units which derive from terephthalic aldehyde and a 1,n-bis(4-aminophenoxy)alkane:

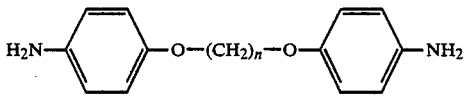

wherein n takes the values 2, 6 or 12, as disclosed by B. Millau et al., in Mol. Cryst. liq. Cryst., Letters, (1979), 49, pages 299–306.

A vital sector of application of thermotropic polymers is their use as reinforcing materials for the conventional thermoplastics materials.

At present, thermoplastics polymers such as the polyamides, polibutylene terephthalate, polyethylene terephthalate, and polycarbonates, are reinforced with materials such as fiberglass, and this occurs whenever it is desired to impart to the artifacts concerned some advantageous properties, especially as regards modulus, dimensional stability, and mechanical resistance.

The shortcomings stemming from the use of such reinforcing materials essentially consist in the wear of the apparatus, due to the abrasive action of fiberglass, difficulties in processing such a mass on account of the high viscosity of the molten mass, which also involves high power consumption, and adhesion problems between the fiberglass and the thermoplastics matrix in which the fiberglass is incorporated.

There is thus in the technical art a long felt want for being able to reinforce the conventional thermoplastics polymers with novel reinforcing materials susceptible of overcoming the problems and the shortcomings enumerated above.

Thermotropic polymers are potentially usable as reinforcing materials for thermoplastics polymers, but, to be apt to such uses, they ought to exhibit a number of necessary properties, namely:

the capability of originating both a mesophase within the molten state working temperature range of the thermoplastics polymers and a nematic structure of same mesophase, as characterized by an orderly arrangement exclusively of the directions which are perpendicular to the axis of the macromolecules, but without any registry between the macromolecules themselves in the parallel direction;

a high propensity towards a preferential orientation of the macromolecules within the thermoplastics matrix;

a substantial immiscibility with the thermoplastic polymer to be reinforced, but concurrent with a good adhesion to the thermoplastics polymer concerned;

a processability of the mixture with the thermoplastics polymer with the conventional machinery and under the usual injection moulding conditions, while concurrently exploiting the possible improvement of the rheological properties of the mixtures, as brought about by the presence of the nematic phase.

Thermotropic polyazomethines having an entirely aromatic structure, which have been referred to above, are used for producing fibres and films possessing a high mechanical resistance, as originated by macromolecular orientation effects. However, due to their high melting range, they do not fulfill the above enumerated requirements for being employed as reinforcing materials for the conventional thermoplastics.

Thermotropic polyazomethines in which stiff units are alternated with flexible segments, exhibit melting temperatures lower than those of the thoroughly aromatic polyazomethines and, up to a certain stage, these temperatures are a function of the value of n in the 1,n-bis(4-aminophenoxy)alkane. However, such melting temperatures (and thus the temperature ranges within which the mesophase is formed) are generally still too high to permit a convenient use of such polyazomethines as the reinforcing materials for the conventional thermoplastics polymers.

The melting temperature can be lowered somewhat by adopting polyazomethines which are prepared from terephthalic aldehyde and an 1,n-bis(4-aminophenoxy)alkane which carries a substituent, for instance a methyl, on the benzene ring.

Such polyazomethines are disclosed, for example, by P. W. Wojtkowski in Macromolecules, (1987), 20, pages 740–748.

It stems from the foregoing that it is difficult so to adjust the temperature of existence of the mesophase in the polyazomethines of the known art, as to render them suitable as reinforcing materials for the particular thermoplastics polymers one desires to reinforce.

It has now been found that, whenever terephthalic aldehyde is copolymerized with one or more 1,n-bis(4-aminophenoxy)alkanes having various values of n, it becomes possible to prepare copolyazomethines having a melting temperature which is below the average of the melting points of the corresponding polyazomethines as obtained from the individual 1,n-bis(4-aminophenoxy)alkanes.

Therefore, by selecting the appropriate 1,n-bis(4-aminophenoxy)alkanes, it becomes possible to produce, both simply and cheaply, thermotropic copolyazomethines having controlled values of the melting temperature, and, consequently, of the temperatures at which the mesophase exists, within the most appropriate ranges having in view their use as reinforcing materials for the conventional thermoplastics polymers.

Accordingly, the present invention relates to thermotropic copolyazomethines which are capable of originating a nematic phase at temperatures above about 240° C., and which contain, in their macromolecule, alternating units derived from:

(A) terephthalic aldehyde:

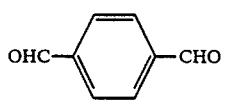

(B) a 1,n-bis(4-aminophenoxy)alkane:

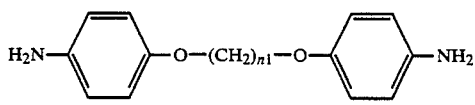

(C) at least one 1,n-bis(4-aminophenoxy)alkane:

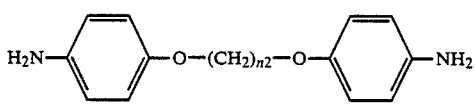

wherein $n_1$ is an integer selected in the interval from 2 to 10, and $n_2$ is an integer selected in the interval from 5 to 11, with the proviso that $n_1$ is different from $n_2$, the (A) units being present in the copolyazomethine in a quantity equal to the sum of the (B) and the (C) units.

Consequentially, the copolyazomethines prepared according to the present invention contain repeating units which can be schematically represented by the formulae:

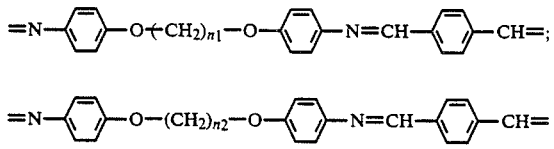

In the preferred embodiment a ratio of the (A):(B):(C) units in the copolyazomethine is selected, which is equal to, or in the order of magnitude of 1:0.5:0.5.

The terephthalic aldehyde to be used as the component (A) of the copolyazomethines according to the present invention can be the technical grade commercial terephthalic aldehyde, which has previously been purified, for example, by crystallization from cyclohexane.

The 1,n-bis(4-aminophenoxy)alkanes to be used as the components (B) and (C) in the subject copolyazomethines can be prepared according to the following reaction pattern:

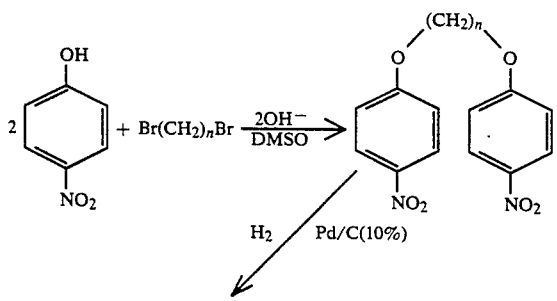

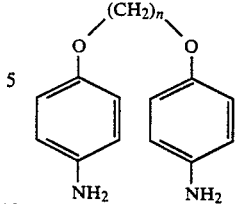

More particularly, the alkylation on the oxygen of paranitrophenol can be carried out by preparing the paranitrophenate by the addition of solid sodium hydroxide to a solution of paranitrophenol in demethylsulphoxide (DMSO) and adding then gradually thereto a solution of a 1,n-dibromoalkane in dimethylsulphoxide.

The reaction trend can be checked by thin-layer chromatography, using an 8:2 blend of n-hexane and ethyl acetate.

The reduction of the thus obtained 1,n-bis(4-nitrophenoxy)alkane can be performed by using hydrogen as the reducing agent, with a catalyst being present: 10% Pd on charcoal is preferred.

The reduction can be caused to take place at room temperature (20° C.–25° C.) until the hydrogen absorption is over.

Also in this case, the reaction run can be checked by thin-layer chromatography, using a 2:8 blend of n-hexane and ethyl acetate as the eluent.

The preparation of the copolyazomethines according to the present invention is conveniently carried out by polymerizing equimolecular amounts of the component (A) and of the sum of the components (B) and (C), by adopting the technique of solution in an inert organic solvent and removing the as-formed by-product water, in the preferred embodiment, the solvent is dioxane at its boiling point under environmental pressure, the as-formed water being removed in the form of a water-dioxane azeotrope.

The thus obtained copolyazomethines can be purified by extraction with hot dioxane.

The characterization of the thermal properties of the copolyazomethines of the present invention can be carried out by Differential Scanning Calorimetry (DSC). Typically, it is possible to detect a crystal-to-crystal transition temperature ($T_1$) to which peak asymmetries, or weak endotherms are associated, which might be attributed to small defect of homogeneousness of the composition or the molecular weight.

The copolyazomethines of the present invention, moreover, exhibit a ($T_2$) crystal-to-nematic phase transition at temperatures comprised within the range of from 240° C. to about 350° C., and a decomposition ($T_3$) between 380° C. and 420° C. approx.

The presence of the nematic phase in the range encompassed by $T_2$ and $T_3$ can be made conspicuous by observation with a polarized-light optical microscope equipped with a heating table.

The X-ray diffraction test of such copolyazomethines makes it possible to evidence an essentially statistical distribution of the (AB) and the (AC) units.

This appears quite clearly from a comparison of the diffraction spectra of the single Figure of the drawings, which shows the spectra of the copolyazomethine CPAM-6/10 and those of the corresponding polyazomethines PAM-6 and PAM-10 as reported in the experimental Examples.

The spectra have been traced by a Philip vertical goniometer, having 1°-slides for the impinging incoming beam, using the CuKᾱ radiation.

As can be seen on the drawing, the reflexions which are present in the narrow angle regions ($2\theta$ less than 10°) in the diffraction spectrum of the copolymer, associated with planes of the crystal lattice which are perpendicular to the axis of the macromolecules, fall to angular values of $2\theta$ which are intermediate between those of the two corresponding homopolymers; moreover, the reflexions observed for the copolymer are significantly more broadened as compared with those observed for the two individual homopolymers.

The copolyazomethines according to the present invention can be processed with the usual procedures, such as injection-moulding or extrusion.

The copolyazomethines in question are preferably used as reinforcing agents of conventional plastics materials, such as polycarbonates, polybutylene terephthalate, polyethylene terephthalate and polyamides.

When, just for comparison, terephthalic aldehyde is polymerized with one 1,n-bis(4-aminophenoxy)alkane only, polyazomethines are obtained, which exhibit a first crystal-to-crystal transition ($T_1$) between 210° C. and 322° C., a crystal-to-nematic phase transition temperature ($T_2$) between 247° C. and 353° C., and a decomposition temperature ($T_3$) between 360° C. and 426° C.

The present invention is now better illustrated by the ensuing experimental examples.

EXAMPLE 1

Preparation of 1,11-bis(4-nitrophenoxy)undecane

A 4-necked flask, equipped with a mechanical stirring device, a dropping funnel, a reflux condenser and a thermometer, is charged with 8.9 g (65 mmol) of paranitrophenol in 20 ml of dimethylsulphoxide. To this solution there are added 2.56 g (64 mmol) of solid pelletized sodium hydroxide. The resultant mixture is heated to 100° C. on an oil bath, until a homogeneous solution is obtained. To the latter solution there are cautiously added 10 g (32 mmol) of 1,11-dibromoundecane, dissolved in 20 ml of dimethylsulphoxide, and, on completion of this addition, the reaction mixture is held at 100° C. for 2 hours. Finally, the reaction mixture is cooled and poured into one litre of continually stirred water, the result being the formation of a solid precipitate which is collected on a filter and repeatedly washed with water. The washed solid is crystallized from ethyl alcohol and 8.8 g of 1,11-bis(4-nitrophenoxy)undecane is obtained (yield 64%).

Working in quite similar a manner, and starting from appropriate dibromoalkanes, the following compounds are prepared:
1,2-bis(4-nitrophenoxy)ethane;
1,4-bis(4-nitrophenoxy)pentane;
1,6-bis(4-nitrophenoxy)hexane;
1,7-bis(4-nitrophenoxy)heptane;
1,8-bis(4-nitrophenoxy)octane;
1,9-bis(4-nitrophenoxy)nonane, and
1,10-bis(4-nitrophenoxy)decane.

EXAMPLE 2

Preparation of 1,11-bis(4-aminophenoxy)undecane

A 200-ml steel autoclave is charged with a solution of 5.5 g of 1,11-bis(4-nitrophenoxy)undecane in 80 ml of ethyl acetate. This solution is supplemented with 0.5 g of 10% Pd on a charcoal substrate.

The autoclave is cooled to −78° C. and twice purged with evacuation and nitrogen.

Gaseous hydrogen is then fed to a pressure of 558.399 kPa (6 kg/cm$^2$) and the reaction mixture is magnetically stirred at room temperature (20° C.-25° C.) until the hydrogen absorption is over (required time about 4 hours).

The reaction mixture is taken up with ethyl acetate and heated to the reflux temperature. Upon removal of the catalyst by filtration of the hot solution, the solvent is evaporated off and a solid residue is obtained, which is crystallized from cyclohexane.

There is obtained 3.4 g of 1,11-bis(4-aminophenoxy)undecane (yield 72%).

Working in a similar manner and starting from appropriate bis(4-nitrophenoxy)alkanes, the following compounds are obtained:
1,2-bis(4-aminophenoxy)ethane;
1,5-bis(4-aminophenoxy)pentane;
1,6-bis(4-aminophenoxy)hexane;
1,7-bis(4-aminophenoxy)heptane;
1,8-bis(4-aminophenoxy)octane;
1,9-bis(4-aminophenoxy)nonane, and
1,10-bis(4-aminophenoxy)decane.

EXAMPLE 3 (reference example)

Preparation of polyazomethine from terephthalic aldehyde and 1,11-bis(4-aminophenoxy)undecane (PAM-11)

A 250-ml flask, equipped with a Dean-Stark apparatus and with a magnetic stirrer, is charged with 0.370 g (1 millimol) of 1,11-bis(4-aminophenoxy)undecane dissolved in 150 ml of dioxane. There are added, subsequently, 0.134 g (1 mmol) of terephthalic aldehyde. The resultant mixture is heated to reflux temperature for one hour whereafter the water-dioxane azeotrope distilling off is started. Distillation is continued until reducing the reaction mixture to a small volume.

The residue of the distillation is taken up with dioxane and extracted with hot dioxane for 4 hours. On completion of such a treatment, there is recovered 0.4 g of the polymer (PAM-11).

By working analogously to the foregoing, the following polyazomethines are prepared, starting from terephthalic aldehyde, and from:
1,2-bis(4-aminophenoxy)ethane (PAM-2)
1,5-bis (4-aminophenoxy)pentane (PAM-5)
1,6-bis (4-aminophenoxy)hexane (PAM-6)
1,7-bis (4-aminophenoxy)heptane (PAM-7)
1,8-bis (4-aminophenoxy)octane (PAM-8)
1,9-bis (4-aminophenoxy)nonane (PAM-9)
1,10-bis(4-aminophenoxy)decane (PAM-10)

EXAMPLE 4

Preparation of the copolyazomethine from terephthalic aldehyde and 1,11-bis(4-aminophenoxy)undecane plus 1,9-bis(4-aminophenoxy)nonane (CPAM-9/11)

A 250-ml flask, equipped with a Dean-Stark apparatus and magnetic stirrer, is charged with 0.185 g (0.5 millimol) of 1,11-bis(4-aminophenoxy)undecane and 0.171 g (0.5 millimol) of 1,9-bis(4-aminophenoxy)nonane in 150 ml of dioxane. 0.134 g (1 millimol) of terephthalic aldehyde is added.

Polymerization runs as in Example 3 and 0.38 g of polymer (CPAM-9/11) is obtained.

Working analogously to the foregoing, the following copolyazomethines are prepared:

CPAM-2/10 from: terephthalic aldehyde, 1,2-bis(4-aminophenoxy)ethane and 1,10-bis(4-aminophenoxy)decane, in the molar ratio of 1:0.5:0.5.

CPAM-5/7 from: terephthalic aldehyde, 1,5-bis(4-aminophenoxy)pentane and 1,7-bis(4-aminophenoxy)heptane, in the molar ratio 1:0.5:0.5.

CPAM-5/9 from: terephthalic aldehyde, 1,5-bis(4-aminophenoxy)pentane and 1,9-bis(4-aminophenoxy)nonane, in the molar ratio 1:0.5:0.5.

CPAM-5/10 from: terephthalic aldehyde, 1,5-bis(4-aminophenoxy)pentane and 1,10-bis(4-aminophenoxy)decane, in the molar ratio 1:0.5:0.5.

CPAM-6/7 from: terephthalic aldehyde, 1,6-bis(4-aminophenoxy)hexane and 1,7-bis(4-aminophenoxy)heptane, in the molar ratio 1:0.5:0.5.

CPAM-5/10 from: terephthalic aldehyde, 1,6-bis(4-aminophenoxy)hexane and 1,10-bis(4-aminophenoxy)decane, in the molar ratio 1:0.5:0.5.

CPAM-7/8 from: terephthalic aldehyde, 1,7-bi(4-aminophenoxy)heptane and 1,8-bis(4-aminophenoxy)octane, in the molar ratio 1:0.5:0.5.

CPAM-7/9 from: terephthalic aldehyde, 1,7-bis(4-aminophenoxy)heptane and 1,9-bis(4-aminophenoxy)nonane, in the molar ratio 1:0.5:0.5.

CPAM-7/10 from: terephthalic aldehyde, 1,7-bis(4-aminophenoxy)heptane and 1,10-bis(4-aminophenoxy)decane, in the molar ratio 1:0.5:0.5.

CPAM-8/10 from: terephthalic aldehyde, 1,8-bis(4-aminophenoxy)octane and 1,10-bis(4-aminophenoxy)decane, in the molar ratio 1:0.5:0.5.

CPAM-9/10 from: terephthalic aldehyde, 1,9-bis(4-aminophenoxy)nonane and 1,10-bis(4-aminophenoxy)decane, in the molar ratio 1:0.5:0.5.

CPAM-6/8/10 from: terephthalic aldehyde, 1,6-bis(4-aminophenoxy)hexane, 1,8-bis(4-aminophenoxy)octane and 1,10-bis(4-aminophenoxy)decane, in the molar ratio 1:0,33:0,33:0,33.

CPAM-5/7/9 from: terephthalic aldehyde, 1,5-bis(4-aminophenoxy)pentane, 1,7-bis(4-aminophenoxy)heptane and 1,9-bis(4-aminophenoxy)nonane, in the molar ratio 1:0,33:0,33:0,33.

CPAM-5/6/7/8/10 from: terephthalic aldehyde, 1,5-bis(4-aminophenoxy)pentane, 1,6-bis(4-aminophenoxy)hexane, 1,7-bis(4-aminophenoxy)heptane, 1,8-bis(4-aminophenoxy)octane, 1,10-bis(4-aminophenoxy)decane, in the molar ratio 1:0.2:0.2:0.2:0.2:0.2.

CPAM-2/5/6/7/8/10 from: terephthalic aldehyde, 1,2-bis-(4-aminophenoxy)ethane, 1,5-bis(4-aminophenoxy)pentane, 1,6-bis(4-aminophenoxy)hexane, 1,7-bis(4-aminophenoxy)heptane, 1,8-bis(4-aminophenoxy)octane and 1,10-bis(4-aminophenoxy)decane, in the molar ratio 1:0.17:0.17:0.17:0.17:0.17:0.17.

The polyazomethines and copolyazomethines as prepared in Examples 3 and 4 are subjected to characterization by Differential Scanning Calorimetry (DSC). The relevant experimental data, reported on Tables 1 and 2, have been obtained by using a Mettler TA3000 instrument, working at a heating speed of 20° C./min.

In Table 1 and 2 the values are reported of:
$T_1$ crystal-to-crystal transition temperature;
$T_2$ crystal-to-nematic phase transition temperature, and
$T_3$ decomposition temperature.

All the tabulated temperatures are Celsius degrees (°C.).

For all the polyazomethines and copolyazomethines, the presence of the nematic phase has been evidenced by observations on a polarized-light optical microscope equipped with a heating table.

TABLE 1

| Polyazomethine | $T_1$ | $T_2$ | $T_3$ |
|---|---|---|---|
| PAM - 2 | 322 | 353 | 426 |
| PAM - 5 | 269 | 295 | 409 |
| PAM - 6 | 238 | 347 | 418 |
| PAM - 7 | 228 | 267 | 393 |
| PAM - 8 | 230 | 292 | 400 |
| PAM - 9 | 226 | 256 | 378 |
| PAM - 10 | 225 | 285 | 383 |
| PAM - 11 | 210 | 247 | 360 |

TABLE 2

| Copolyazomethine | $T_1$ | $T_2$ | $T_3$ |
|---|---|---|---|
| CPAM - 2/10 | 204 | 325 | 412 |
| CPAM - 5/7 | 220 | 260 | 396 |
| CPAM - 5/9 | 213/220 | 262 | 405 |
| CPAM - 5/10 | 203 | 275 | 403 |
| CPAM - 6/7 | 208 | 308 | 418 |
| CPAM - 6/10 | 200 | 289 | 401 |
| CPAM - 7/8 | 205 | 292 | 408 |
| CPAM - 7/9 | 207 | 246 | 390 |
| CPAM - 7/10 | 205 | 260 | 392 |
| CPAM - 8/10 | 207 | 293 | 395 |
| CPAM - 9/10 | 206 | 273 | 383 |
| CPAM - 9/11 | 197 | 241 | 379 |
| CPAM - 6/8/10 | 194 | 291 | 408 |
| CPAM - 5/7/9 | 203 | 266 | 405 |
| CPAM-5/6/7/8/10 | 197 | 284 | 407 |
| CPAM-2/5/6/7/8/10 | 187 | 301 | 418 |

What is claimed is:

1. Thermotropic copolyazomethines having a nematic phase at temperatures over 24020 C. and containing in the macromolecule alternated units derived from:

(A) terephthalic aldehyde

(B) a 1,n-bis(4-aminophenoxy)alkane:

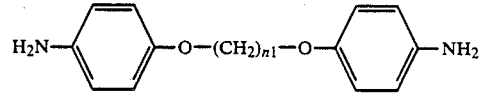

(C) at least one 1,n-bis-(4-aminophenoxy)alkane

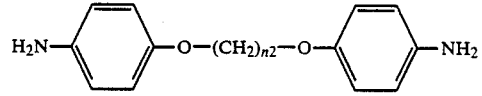

wherein: $n_1$ is an integer selected in the range from 2 to 10, $n_2$ is an integer selected in the range from 5 to 11, with the proviso that $n_1$ is different from $n_2$, the (A) units being present in the copolyazomethine in an amount equal to the sum of the units (B) and (C).

2. Copolyazomethines according to claim 1, characterized in that they contain the units (A), (B) and (C) in a ratio equal to, or nearly equal to 1:0.5:0.5.

3. A process for preparing thermotropic copolyazomethines having a nematic phase at temperature over 240° C. and containing in the macromolecule alternated units derived from:

(A) terephthalic aldehyde:

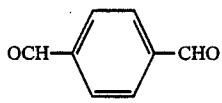

(B) a 1,n-bis(4-aminophenoxy)alkane:

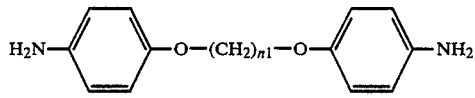

(C) at least one 1,n-bis-(4-aminophenoxy)alkane:

-continued

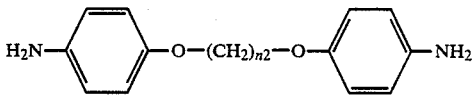

wherein: $n_1$ is an integer selected in the range of from 2 to 10, $n_2$ is an integer selected in the range of from 5 to 11, with the proviso that $n_1$ is different from $n_1$, and wherein the (A) units are present in an amount equal to the sum of the (B) and (C) units, said process comprising copolymerizing equimolar amounts of (A) and the sum of (B) and (C) in solution comprising an inert organic solvent, and removing water from the reaction mixture.

4. Process according to claim 3, characterized in that the inert organic solvent is dioxane and water is removed in the form of a water-dioxane azeotrope from the reaction mixture maintained at the boiling point at the environmental pressure.

5. The process of claim 3 wherein the units (A), (B), and (C) are prepared in a ratio equal to, or nearly equal to 1:0.5:0.5.

* * * * *